United States Patent
Hoofard et al.

(10) Patent No.: US 12,400,175 B2
(45) Date of Patent: Aug. 26, 2025

(54) TRAILER VALIDATION SYSTEMS

(71) Applicant: ASSA ABLOY Entrance Systems AB, Landskrona (SE)

(72) Inventors: Richard K. Hoofard, Dallas, TX (US); Daryl Day, Frisco, TX (US)

(73) Assignee: ASSA ABLOY Entrance Systems AB, Landskrona (SE)

( * ) Notice: Subject to any disclaimer, the term of this patent is extended or adjusted under 35 U.S.C. 154(b) by 79 days.

(21) Appl. No.: 18/071,425

(22) Filed: Nov. 29, 2022

(65) Prior Publication Data

US 2023/0169449 A1 Jun. 1, 2023

Related U.S. Application Data

(60) Provisional application No. 63/284,501, filed on Nov. 30, 2021.

(30) Foreign Application Priority Data

Mar. 29, 2022 (SE) .................................... 2230098-2
Mar. 29, 2022 (SE) .................................... 2230099-0

(51) Int. Cl.
*G06Q 10/0835* (2023.01)
*B60Q 1/50* (2006.01)
(Continued)

(52) U.S. Cl.
CPC ....... *G06Q 10/0835* (2013.01); *B60Q 1/5035* (2022.05); *B60R 13/10* (2013.01);
(Continued)

(58) Field of Classification Search
CPC ........... G06Q 10/0835; G06Q 30/0265; B60Q 1/5035; B60Q 1/305; B60R 13/10; G06K 7/1417
See application file for complete search history.

(56) References Cited

U.S. PATENT DOCUMENTS 1,775,909 A 9/1930 Mikkelsen
2,362,981 A 11/1944 Philemon
(Continued)

FOREIGN PATENT DOCUMENTS

AU 2005100075 A4 4/2005
CA 2963656 A1 11/2017
(Continued)

OTHER PUBLICATIONS

Hamid, Erman, et al. "Implementation of Intelligent Automated Gate System with QR Code." International Journal of Advanced Computer Science and Applications 9.10 (2018). (Year: 2018).*
(Continued)

*Primary Examiner* — Jeff Zimmerman
*Assistant Examiner* — Brian Tallman
(74) *Attorney, Agent, or Firm* — Perkins Coie LLP

(57) ABSTRACT

The present disclosure is directed generally to trailer validation systems and, more particularly, to systems capable of verifying that a trailer is associated with the proper loading dock station. In some embodiments, a trailer validation system includes a display, a processor operably connected to the display, a communication device operably coupled to the processor, and a non-transitory computer-readable medium containing instructions for operating the trailer validation system. The display screen can be positioned on a trailer or at a loading dock. The communication device can receive information related to an identity of the trailer. The instructions can be executed by the processor to cause the display to display at least a portion of the information. When the display is positioned at the loading dock, the displayed information can be readable by a device mounted to the trailer to enable the trailer to identify the loading dock station.

10 Claims, 7 Drawing Sheets

(51) Int. Cl.
  *B60R 13/10* (2006.01)
  *G06K 7/14* (2006.01)
  *B60Q 1/30* (2006.01)
  *G06Q 30/0251* (2023.01)

(52) U.S. Cl.
  CPC ............ *G06K 7/1417* (2013.01); *B60Q 1/305* (2013.01); *G06Q 30/0265* (2013.01)

(56) References Cited

U.S. PATENT DOCUMENTS

| | | | |
|---|---|---|---|
| 2,883,182 A | 4/1959 | William | |
| 2,887,865 A | 5/1959 | Moler | |
| 3,051,014 A | 8/1962 | Houk | |
| 3,439,728 A | 4/1969 | Martini | |
| 3,630,557 A | 12/1971 | Pierce et al. | |
| 3,635,277 A | 1/1972 | Bahnsen | |
| 3,813,119 A | 5/1974 | Panici | |
| 3,894,571 A | 7/1975 | Hinchliff | |
| 4,009,051 A | 2/1977 | Kazis et al. | |
| 4,010,571 A | 3/1977 | Mcguire et al. | |
| 4,147,073 A | 4/1979 | Mercier | |
| 4,286,911 A | 9/1981 | Benjamin | |
| 4,476,853 A | 10/1984 | Arbogast | |
| 4,590,118 A | 5/1986 | Yatabe et al. | |
| 4,625,456 A | 12/1986 | Lafontaine | |
| 4,626,983 A | 12/1986 | Harada et al. | |
| 4,661,758 A | 4/1987 | Whittaker | |
| 4,744,121 A | 5/1988 | Swessel et al. | |
| 4,821,456 A | 4/1989 | Nogaki | |
| 4,843,373 A | 6/1989 | Trickle et al. | |
| 4,860,813 A | 8/1989 | Ballyns et al. | |
| 4,878,529 A | 11/1989 | Hormann | |
| 4,936,731 A | 6/1990 | Noble | |
| 4,988,254 A | 1/1991 | Alexander | |
| 5,026,242 A | 6/1991 | Alexander | |
| 5,047,748 A | 9/1991 | Trickle | |
| 5,056,847 A | 10/1991 | Stillwell et al. | |
| 5,085,094 A | 2/1992 | Clawson et al. | |
| 5,168,262 A | 12/1992 | Okayama | |
| 5,168,267 A | 12/1992 | Trickle | |
| 5,181,401 A | 1/1993 | Hodan | |
| 5,196,965 A | 3/1993 | Lang et al. | |
| 5,277,240 A | 1/1994 | Epema et al. | |
| 5,323,098 A | 6/1994 | Hamaguchi et al. | |
| 5,403,142 A | 4/1995 | Stewart | |
| 5,495,102 A | 2/1996 | Fine | |
| 5,544,924 A | 8/1996 | Paster | |
| 5,565,843 A * | 10/1996 | Meyvis | G08B 13/22 49/31 |
| 5,576,533 A | 11/1996 | Tantraporn | |
| 5,775,107 A | 7/1998 | Sparkman | |
| 5,831,540 A | 11/1998 | Sullivan et al. | |
| 5,886,863 A | 3/1999 | Nagasaki et al. | |
| 5,886,883 A | 3/1999 | Rai | |
| 5,898,585 A | 4/1999 | Sirichote et al. | |
| 5,915,446 A | 6/1999 | De | |
| 6,082,952 A | 7/2000 | Alexander | |
| 6,125,582 A | 10/2000 | Mondragon et al. | |
| 6,134,835 A | 10/2000 | Krupke et al. | |
| 6,179,036 B1 | 1/2001 | Harvey | |
| 6,276,744 B1 | 8/2001 | Huber et al. | |
| 6,367,259 B1 | 4/2002 | Timm | |
| 6,369,462 B1 | 4/2002 | Siri | |
| 6,390,245 B1 | 5/2002 | Metz | |
| 6,442,897 B1 | 9/2002 | Mullet | |
| 6,476,572 B2 | 11/2002 | Lounsbury | |
| 6,523,823 B1 | 2/2003 | Bakoledis | |
| 6,543,375 B1 | 4/2003 | Sargent et al. | |
| 6,663,527 B2 | 12/2003 | Phelan et al. | |
| 6,781,516 B2 | 8/2004 | Reynard et al. | |
| 6,787,259 B2 | 9/2004 | Colborn et al. | |
| 6,810,817 B1 | 11/2004 | James | |
| 6,812,849 B1 | 11/2004 | Ancel | |
| 6,917,298 B2 | 7/2005 | Romano et al. | |
| 6,972,226 B2 | 12/2005 | Deppe et al. | |
| 6,975,226 B2 | 12/2005 | Reynard et al. | |
| 7,032,720 B2 | 4/2006 | Jette et al. | |
| 7,045,764 B2 | 5/2006 | Beggs et al. | |
| 7,119,673 B2 | 10/2006 | Eager et al. | |
| 7,162,762 B1 | 1/2007 | Gleason | |
| 7,165,486 B2 | 1/2007 | Alexander et al. | |
| 7,230,819 B2 | 6/2007 | Muchow et al. | |
| 7,254,868 B2 | 8/2007 | Mullet et al. | |
| 7,256,703 B2 | 8/2007 | Duvernell et al. | |
| 7,264,092 B2 | 9/2007 | Jette | |
| 7,274,300 B2 | 9/2007 | Duvernell et al. | |
| 7,327,107 B2 | 2/2008 | Mullet et al. | |
| 7,333,016 B2 | 2/2008 | Ancel | |
| 7,380,375 B2 | 6/2008 | Maly | |
| 7,686,061 B2 | 3/2010 | Mullet et al. | |
| 7,730,981 B2 | 6/2010 | Mccabe et al. | |
| 7,750,890 B2 | 7/2010 | Fitzgibbon et al. | |
| 7,864,030 B2 | 1/2011 | Jette | |
| 7,956,718 B2 | 6/2011 | Murphy et al. | |
| 8,058,970 B2 | 11/2011 | Mullet et al. | |
| 8,065,770 B2 | 11/2011 | Proffitt et al. | |
| 8,112,949 B2 | 2/2012 | Eungard | |
| 8,181,401 B2 | 5/2012 | Eungard | |
| 8,286,757 B2 | 10/2012 | Nelson | |
| 8,307,589 B2 | 11/2012 | Eungard | |
| 8,307,956 B2 | 11/2012 | Andersen et al. | |
| 8,345,010 B2 | 1/2013 | Fitzgibbon et al. | |
| 8,364,334 B2 | 1/2013 | Au et al. | |
| 8,407,842 B2 | 4/2013 | Story et al. | |
| 8,410,895 B2 | 4/2013 | Murphy et al. | |
| 8,421,611 B1 | 4/2013 | Coshow et al. | |
| 8,490,669 B2 | 7/2013 | Fletcher et al. | |
| 8,497,761 B2 | 7/2013 | Mcneill et al. | |
| 8,510,888 B2 | 8/2013 | Eungard | |
| 8,528,622 B2 | 9/2013 | Ehrlich | |
| 8,547,234 B2 | 10/2013 | Maly et al. | |
| 8,590,087 B2 | 11/2013 | Swessel et al. | |
| 8,590,674 B2 | 11/2013 | Jette | |
| 8,775,710 B1 | 7/2014 | Miller et al. | |
| 8,893,764 B2 | 11/2014 | Mascari et al. | |
| 8,959,838 B1 | 2/2015 | Marinelli | |
| 8,976,006 B2 | 3/2015 | Krupke et al. | |
| 8,978,562 B2 | 3/2015 | Nagamine et al. | |
| 9,211,889 B1 | 12/2015 | Hoetzer et al. | |
| 9,230,419 B2 | 1/2016 | Beggs et al. | |
| 9,234,377 B2 | 1/2016 | Schatz et al. | |
| 9,274,522 B2 | 3/2016 | Boos et al. | |
| 9,283,935 B2 | 3/2016 | Fujioka | |
| 9,487,984 B2 | 11/2016 | Wachtell et al. | |
| 9,517,902 B2 | 12/2016 | Harrington | |
| 9,564,072 B2 | 2/2017 | Senfleben et al. | |
| 9,623,859 B2 | 4/2017 | Lavoie et al. | |
| 9,633,537 B2 | 4/2017 | Beggs et al. | |
| 9,656,691 B2 | 5/2017 | Heimberger et al. | |
| 9,751,702 B1 | 9/2017 | Hoofard et al. | |
| 9,771,225 B2 | 9/2017 | Stone et al. | |
| 9,776,511 B2 | 10/2017 | Brooks et al. | |
| 9,777,529 B2 | 10/2017 | Mcneill et al. | |
| 9,926,148 B2 | 3/2018 | Hochstein et al. | |
| 9,957,121 B2 | 5/2018 | Sveum et al. | |
| 10,032,380 B2 | 7/2018 | Mushynski et al. | |
| 10,053,904 B2 | 8/2018 | Mcneill et al. | |
| 10,081,504 B2 | 9/2018 | Walford et al. | |
| 10,096,187 B2 | 10/2018 | Deneen et al. | |
| 10,106,342 B2 | 10/2018 | Avalos | |
| 10,113,352 B2 | 10/2018 | McNeill et al. | |
| 10,227,190 B2 | 3/2019 | Brooks et al. | |
| 10,332,058 B1 * | 6/2019 | Kandregula | G06Q 10/083 |
| 10,358,858 B2 | 7/2019 | Lietz et al. | |
| 10,435,936 B2 | 10/2019 | Lietz et al. | |
| 10,444,965 B2 | 10/2019 | Daley et al. | |
| 10,494,205 B1 | 12/2019 | Hoofard et al. | |
| 10,829,970 B2 | 11/2020 | Ehrlich et al. | |
| 10,878,386 B2 | 12/2020 | Hoofard et al. | |
| 10,947,069 B2 | 3/2021 | Brooks et al. | |
| 11,124,372 B2 | 9/2021 | Hoofard et al. | |
| 11,142,413 B2 | 10/2021 | Hoofard et al. | |
| 11,225,402 B1 | 1/2022 | Stokes | |

(56) References Cited

U.S. PATENT DOCUMENTS

| | | |
|---|---|---|
| 11,225,824 B2 | 1/2022 | Hoofard et al. |
| 11,256,264 B2 | 2/2022 | Hoofard et al. |
| 11,262,747 B2 | 3/2022 | Hoofard et al. |
| 11,305,953 B2 | 4/2022 | Hoofard et al. |
| 11,358,813 B2 | 6/2022 | Walford et al. |
| 11,392,141 B2 | 7/2022 | Dinh |
| 11,507,926 B2 | 11/2022 | Hoofard et al. |
| 11,548,743 B2 | 1/2023 | Hoofard et al. |
| 11,668,131 B2 | 6/2023 | McNeill et al. |
| 11,834,014 B2 | 12/2023 | Yu et al. |
| 11,919,343 B2 | 3/2024 | Mckibben et al. |
| 2001/0035667 A1 | 11/2001 | Gaeta |
| 2002/0089427 A1 | 7/2002 | Aratani et al. |
| 2002/0130065 A1* | 9/2002 | Bloom ............... B07C 3/00 |
| | | 209/630 |
| 2003/0167238 A1 | 9/2003 | Zeif et al. |
| 2004/0146384 A1 | 7/2004 | Whelan |
| 2004/0182619 A1 | 9/2004 | Mcgregor et al. |
| 2005/0050438 A1 | 3/2005 | Cheung et al. |
| 2005/0102041 A1 | 5/2005 | Duvernell et al. |
| 2005/0102042 A1 | 5/2005 | Reynard et al. |
| 2005/0126081 A1 | 6/2005 | Patel et al. |
| 2005/0261789 A1 | 11/2005 | Chen |
| 2005/0262549 A1 | 11/2005 | Ritt et al. |
| 2006/0099965 A1 | 5/2006 | Aaron |
| 2006/0119132 A1 | 6/2006 | Rivers et al. |
| 2006/0137261 A1 | 6/2006 | Maly |
| 2006/0145853 A1 | 7/2006 | Richards et al. |
| 2006/0158752 A1 | 7/2006 | Perkes |
| 2006/0181391 A1 | 8/2006 | Mcneill et al. |
| 2006/0235737 A1 | 10/2006 | Fleurant et al. |
| 2006/0289128 A1 | 12/2006 | Ressel et al. |
| 2007/0062422 A1 | 3/2007 | Wotring |
| 2007/0157614 A1 | 7/2007 | Goldman |
| 2007/0256797 A1 | 11/2007 | Orton et al. |
| 2007/0258798 A1 | 11/2007 | Foster et al. |
| 2007/0283806 A1 | 12/2007 | Morrison |
| 2008/0011799 A1 | 1/2008 | Chang |
| 2008/0018438 A1 | 1/2008 | Ehrlich et al. |
| 2008/0022596 A1 | 1/2008 | Boerger et al. |
| 2008/0124203 A1 | 5/2008 | Mcdonald |
| 2008/0127435 A1 | 6/2008 | Maly et al. |
| 2008/0143290 A1 | 6/2008 | Chavakula |
| 2009/0013497 A1 | 1/2009 | Squyres et al. |
| 2009/0024979 A1 | 1/2009 | Chessell et al. |
| 2009/0044191 A1 | 2/2009 | Chai et al. |
| 2009/0093688 A1 | 4/2009 | Mathur |
| 2009/0267744 A1 | 10/2009 | Penot |
| 2010/0073197 A1 | 3/2010 | Eagleton et al. |
| 2010/0146719 A1 | 6/2010 | Swessel et al. |
| 2010/0289623 A1 | 11/2010 | Roesner |
| 2011/0075441 A1 | 3/2011 | Swessel et al. |
| 2011/0203059 A1 | 8/2011 | Whitley et al. |
| 2011/0301800 A1 | 12/2011 | Furuno et al. |
| 2011/0313893 A1 | 12/2011 | Weik |
| 2012/0025964 A1 | 2/2012 | Beggs et al. |
| 2012/0125545 A1 | 5/2012 | Ehrlich |
| 2012/0304558 A1 | 12/2012 | Iglesias et al. |
| 2013/0024334 A1 | 1/2013 | Kozlay |
| 2013/0038731 A1 | 2/2013 | Brey et al. |
| 2013/0059603 A1* | 3/2013 | Guenec ............. G07C 9/00571 |
| | | 455/456.2 |
| 2013/0117078 A1* | 5/2013 | Weik, III ................ B60R 25/00 |
| | | 705/13 |
| 2013/0134938 A1 | 5/2013 | Bianco |
| 2013/0188050 A1 | 7/2013 | Winget |
| 2013/0261958 A1 | 10/2013 | Herron |
| 2013/0312205 A1 | 11/2013 | Riviere et al. |
| 2013/0327914 A1 | 12/2013 | Mcneill et al. |
| 2013/0332217 A1 | 12/2013 | Mcneill et al. |
| 2014/0070767 A1 | 3/2014 | Morris et al. |
| 2014/0075842 A1 | 3/2014 | Mcneill et al. |
| 2014/0137447 A1 | 5/2014 | Mama |
| 2014/0222971 A1 | 8/2014 | Cooper et al. |
| 2014/0225509 A1 | 8/2014 | Wiegel et al. |
| 2014/0247347 A1 | 9/2014 | Mcneill et al. |
| 2014/0251556 A1 | 9/2014 | Orton |
| 2015/0009046 A1* | 1/2015 | Senfleben ............... G09F 21/04 |
| | | 340/901 |
| 2015/0013083 A1 | 1/2015 | Palmersheim |
| 2015/0039552 A1 | 2/2015 | Moyne |
| 2015/0047132 A1 | 2/2015 | Sveum et al. |
| 2015/0047133 A1 | 2/2015 | Sveum |
| 2015/0294166 A1 | 10/2015 | Kuehnle et al. |
| 2015/0308175 A1 | 10/2015 | Wachtell et al. |
| 2016/0031482 A1 | 2/2016 | Lavoie |
| 2016/0075526 A1 | 3/2016 | Avalos |
| 2016/0090072 A1 | 3/2016 | Eppley et al. |
| 2016/0104364 A1 | 4/2016 | Brooks et al. |
| 2016/0178382 A1 | 6/2016 | Penna et al. |
| 2016/0288833 A1 | 10/2016 | Heimberger et al. |
| 2016/0362135 A1 | 12/2016 | Xu et al. |
| 2016/0368489 A1 | 12/2016 | Aich et al. |
| 2016/0369619 A1 | 12/2016 | Parmeshwar et al. |
| 2017/0008498 A1 | 1/2017 | Garrow et al. |
| 2017/0017392 A1 | 1/2017 | Castaneda et al. |
| 2017/0043967 A1 | 2/2017 | Walford et al. |
| 2017/0044817 A1 | 2/2017 | Mcneill et al. |
| 2017/0073005 A1 | 3/2017 | Jawad et al. |
| 2017/0106794 A1 | 4/2017 | Constantine |
| 2017/0120734 A1 | 5/2017 | Westerdale |
| 2017/0168501 A1 | 6/2017 | Aoki et al. |
| 2017/0174209 A1 | 6/2017 | Lavoie |
| 2017/0205824 A1 | 7/2017 | Nordbruch et al. |
| 2017/0213404 A1 | 7/2017 | Sivalingam et al. |
| 2017/0320685 A1 | 11/2017 | Hoofard et al. |
| 2018/0035606 A1 | 2/2018 | Burdoucci |
| 2018/0278897 A1 | 9/2018 | Seaman et al. |
| 2018/0346029 A1 | 12/2018 | Kabos et al. |
| 2019/0002216 A1 | 1/2019 | Walford et al. |
| 2019/0039425 A1 | 2/2019 | Dodd et al. |
| 2019/0056736 A1 | 2/2019 | Wood et al. |
| 2019/0064835 A1 | 2/2019 | Hoofard et al. |
| 2019/0144218 A1 | 5/2019 | Hoofard et al. |
| 2019/0187716 A1 | 6/2019 | Cantrell et al. |
| 2019/0197318 A1 | 6/2019 | Krishnamurthy et al. |
| 2019/0202646 A1 | 7/2019 | Brooks et al. |
| 2019/0226239 A1 | 7/2019 | Trentham et al. |
| 2019/0301224 A1 | 10/2019 | Barton |
| 2019/0302764 A1 | 10/2019 | Smith et al. |
| 2019/0316403 A1 | 10/2019 | Aiello |
| 2019/0392402 A1 | 12/2019 | Vandergon et al. |
| 2020/0002993 A1 | 1/2020 | Thouin |
| 2020/0018110 A1 | 1/2020 | Lindley et al. |
| 2020/0087970 A1 | 3/2020 | Nielson et al. |
| 2020/0115948 A1 | 4/2020 | Lietz et al. |
| 2020/0125074 A1 | 4/2020 | Ramos et al. |
| 2020/0133259 A1 | 4/2020 | Van Wiemeersch et al. |
| 2020/0180881 A1* | 6/2020 | Hoofard ............... H04L 9/3231 |
| 2020/0239242 A1 | 7/2020 | Hoofard et al. |
| 2020/0273133 A1 | 8/2020 | Morris |
| 2020/0334631 A1 | 10/2020 | Conlon |
| 2020/0361326 A1 | 11/2020 | Krucinski et al. |
| 2020/0393828 A1 | 12/2020 | Hoofard et al. |
| 2021/0079710 A1 | 3/2021 | Evans et al. |
| 2021/0082220 A1 | 3/2021 | Boerger et al. |
| 2021/0238908 A1 | 8/2021 | Ramage et al. |
| 2022/0146269 A1 | 5/2022 | Hoofard et al. |
| 2022/0170311 A1 | 6/2022 | McNeill et al. |
| 2022/0243524 A1 | 8/2022 | Hoofard et al. |
| 2022/0306410 A1 | 9/2022 | Hoofard et al. |
| 2022/0338719 A1 | 10/2022 | Walford et al. |
| 2022/0349715 A1* | 11/2022 | Park ..................... G01C 21/28 |
| 2022/0388380 A1 | 12/2022 | Hoofard et al. |
| 2023/0003074 A1 | 1/2023 | Hoofard et al. |
| 2024/0051521 A1 | 2/2024 | James et al. |

FOREIGN PATENT DOCUMENTS

| | | |
|---|---|---|
| CA | 3067610 A1 | 7/2020 |
| CN | 2075169 U | 4/1991 |
| CN | 101716959 A | 6/2010 |
| CN | 103485613 B | 6/2015 |
| DE | 19836432 A1 | 3/1999 |

(56) References Cited

FOREIGN PATENT DOCUMENTS

| | | |
|---|---|---|
| DE | 202005008059 U1 | 11/2005 |
| DE | 102004037933 B3 | 2/2006 |
| DE | 202004016760 U1 | 3/2006 |
| DE | 102006014153 A1 | 10/2007 |
| DE | 202013008638 U1 | 11/2013 |
| EP | 0729856 A1 | 9/1996 |
| EP | 2215612 B1 | 8/2012 |
| EP | 2660170 A1 | 11/2013 |
| EP | 2692561 A1 | 2/2014 |
| FR | 933292 A | 4/1948 |
| FR | 2797246 A1 | 2/2001 |
| FR | 2869470 A1 | 10/2005 |
| GB | 1527046 A | 10/1978 |
| NL | 8902808 A | 6/1991 |
| WO | 2005045169 A1 | 5/2005 |
| WO | 2006066013 A2 | 6/2006 |
| WO | 2006076538 A2 | 7/2006 |
| WO | 2008014026 A1 | 1/2008 |
| WO | 2008014206 A1 | 1/2008 |
| WO | 2008036087 A1 | 3/2008 |
| WO | 2009070509 A1 | 6/2009 |
| WO | 2010077977 A1 | 7/2010 |
| WO | 2011037839 A1 | 3/2011 |
| WO | 2015023666 A1 | 2/2015 |
| WO | 2015023669 A1 | 2/2015 |
| WO | 2015084167 A1 | 6/2015 |
| WO | 2015166339 A1 | 11/2015 |
| WO | 2016007321 | 1/2016 |
| WO | 2016209141 A1 | 12/2016 |
| WO | 2017100716 A1 | 6/2017 |
| WO | 2019090199 A1 | 5/2019 |
| WO | 2019173811 A2 | 9/2019 |
| WO | 2019209773 A1 | 10/2019 |
| WO | 2020156936 A1 | 8/2020 |

OTHER PUBLICATIONS

Dock Lighting Goes Green with the FT Ultra LED Docklight:, APS Resource, News Release. 1 page.

Pentalift introduces industry's first solar powered dock leveler!www.pentalift.com, Jun. 14, 2011, 1 page.

APS&GO—LED Communication System Specification Sheet, APS Resource, For APS1102, Nov. 2009, 2 pages.

Bin et al., Constrained Model Predictive Control for Backing-up Tractor-Trailer System, Proceeding of the 10th World Congress on Intelligent Control and Automation, Jul. 6-8, 2012, Beijing, China, pp. 2165-2170.

Desantis et al., Path-Tracking for Tractor-Trailers with Hitching of Both the On-Axle and the Off-Axle Kind, Proceedings of the 2002 IEEE International Symposium on Intelligent Control, 2002.

Energy Saving Products Brochure, APS Resource, Mar. 2009, 4 pages.

FT Ultra LED Flex Arm Docklight Specification Sheet, APS Resource, Form APS 1168, Nov. 2009, 2 pages.

Fuchs C et al: "3D pose estimation for articulated vehicles using Kalman-filter based tracking", Pattern Ricognition. Image Analysis, Allen Press, Lawrence, KS, US, vol. 26, No. 1, Jul. 23, 2016 (Jul. 23, 2016), pp. 109-113.

High Impact LED Dock Light Specification Sheet, APS Resource, Form APS1171, Nov. 2009, 2 pages.

International Search Report and Written Opinion for PCT/US2009/068306; Applicant: 4Front Engineered Solutions, Inc .; Date of Mailing: Mar. 10, 2010, 9 pages.

International Search Report and Written Opinion mailed Oct. 12, 2015; International Application No. PCT/IB2015/000698; 9 pages.

Kelley Company; Vehicle Restraints brochure; 2008; 8 pages.

Manual and Automatic Light Communication Systems, User's Manual, Serco, Oct. 2009, 28 pages.

McGovern et al., An Articulated Truck on a Spreadsheet, Level 3, Issue 1, Nov. 2003, 23 pages.

Model G307K2 Kadet 2 Operator Interface with 7 TFT Display, Red Lion Controls, Inc., Nov. 23, 2015, 4 pages.

Oreh et al., A New Method for Directional Control of a Tractor Semi-Trailer, Australian Journal of Basic and Applied Sciences, 6(12): 369-409, 2012.

Rite-Hite Corporation, Rite-Vu Light Communication Systems Brochure, 6 pages [Not dated].

Safety & Lighting Products Brochure, APS Resource, Sep. 2004, 2 pages.

Serco Vehicle Restraints brochure; 2008; 4 pages.

Serco; Loading Dock Solutions brochure; 2008; 8 pages.

Smart Power Systems International GmbH, Web pages for Hybrid DC/AC Power Supply, Jun. 1, 2004.

Tofael Ahamed: "Navigation of an Autonomous Tractor Using Multiple Sensors", Thesis, Feb. 22, 2008 (Feb. 22, 2008), XP055527539, retrieved from the Internet: URL: https ://tsukuba.repo.nii.ac.jp, [retrieved on 2018-11-27], Chapter 9.

* cited by examiner

TRAILER VALIDATION SYSTEMS

CROSS-REFERENCE TO RELATED APPLICATIONS

This application claims the benefit of (i) U.S. Provisional Patent Application No. 63/284,501, filed Nov. 30, 2021, and titled "TRAILER VALIDATION SYSTEMS," (ii) Swedish Patent Application No. 2230098-2, filed Mar. 29, 2022, and (iii) Swedish Patent Application No. 2230099-0, filed Mar. 29, 2022; each of which is incorporated herein by reference in its entirety.

TECHNICAL FIELD

The present disclosure is directed generally to trailer and/or loading dock station validation systems and, more particularly, to systems capable of verifying that a trailer is associated with the proper loading dock station.

BACKGROUND

Distribution centers are often used to receive, process, and/or re-ship units, parcels, and other goods and materials; and manufacturing centers typically require the delivery of consumable materials and the shipment of finished products. Regardless of their specific function, distribution, processing and manufacturing centers may include a warehouse or other industrial building having one or more loading dock stations, a perimeter barrier, a gated entrance and/or exit, and parking or staging areas where idle trailers may be parked. For ease of reference, such areas may be referred to herein as a "logistics yards."

A common feature of logistics yards is that trailers are entering, moving within, docking at stations, and exiting the logistics yard throughout the day. Vehicle docking facilities, such as warehouses, typically include multiple loading docking stations that facilitate the movement of goods between the facility and a vehicle parked at the docking station. For example, even moderate-size logistics yards typically include numerous loading dock stations that see a great deal of inbound and outbound traffic and require coordinated use. As a result, it is often necessary to keep detailed tracking information for each trailer within logistics yards. Dock management systems can use identifying information of the trailer to verify that the trailer is at the proper location based on a scheduling database.

BRIEF DESCRIPTION OF THE DRAWINGS

Many aspects of the present disclosure can be better understood with reference to the following drawings. The components in the drawings are not necessarily to scale. Instead, emphasis is placed on clearly illustrating the principles of the present disclosure.

DETAILED DESCRIPTION

Figure 1:
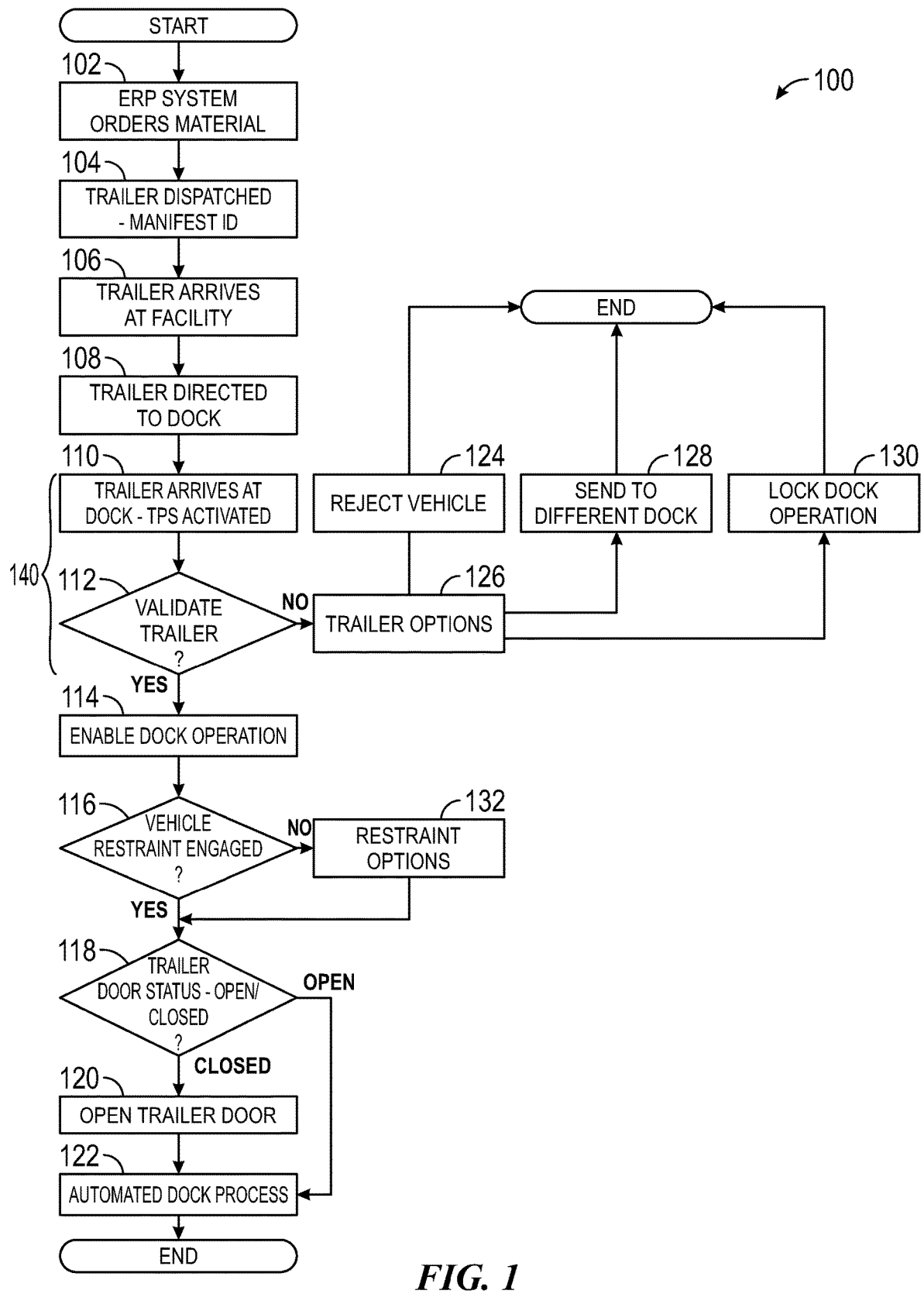
FIGS. 1-3 are flowcharts of loading dock operational steps configured in accordance with embodiments of the present technology.

The following disclosure describes various embodiments of trailer validation systems that allow identification and verification of a trailer in reference to a loading dock station, e.g., to verify that the trailer is at the proper loading dock station. The trailer validation systems described herein can have components mounted to the trailer and/or mounted to or in the proximity of the loading dock station. Trailer validation systems mounted to the trailer can be configured to identify the loading dock station (e.g., by receiving information related to, for example, an identification number of the loading dock station, a code or other indicia of the loading dock station, a location of the loading dock station, a type of the loading dock station, systems associated with the loading dock station, a schedule for the loading dock station, an operator of the loading dock station, a status of the loading dock station, etc.) and verify whether the trailer is associated with (e.g., approaching and/or parked at) the intended loading dock station depending on a logistics yard workflow, a trailer to loading dock station assignment, etc., and/or can be configured to transmit an identification signal to a loading dock system so that the loading dock system can identify the trailer. Trailer validation systems mounted to or in the proximity of the loading dock station can be configured to identify the trailer (e.g., by receiving information related to, for example, an identification number of the trailer, a code or other indicia of the trailer, a type of the trailer, a payload of the trailer, systems associated with the trailer, a schedule for the trailer, an operator of the trailer, a status of the trailer, a destination of the trailer, etc.) and verify whether the trailer is approaching and/or parked at the intended loading dock station, and/or can be configured to transmit an identification signal to the trailer system so that the trailer system can identify the loading dock station. Some vehicle identification and logistics yard guidance systems are disclosed in U.S. patent application Ser. No. 16/438,347, filed Jun. 11, 2019, and titled "VEHICLE IDENTIFICATION AND GUIDANCE SYSTEMS AND ASSOCIATED METHODS," which is incorporated by reference herein in its entirety. In some embodiments, the identity of the loading dock station and/or trailer can be ascertained by scanning a code (e.g., a QR code, a bar code, an alpha-numeric code, and/or other computer-readable indicia, etc.), by receiving a signal from a short range communication device (e.g., radio-frequency identification (RFID), BLUETOOTH®, near field communications (NFC), etc.), or any other suitable identification method or combination thereof. As used herein, the term "trailer" is intended to include any load-carrying vehicle, transport vehicle, box truck, flatbed, etc. and should not be construed as limited to only trailers transported by tractors.

Upon verification that the trailer is positioned at the intended loading dock station, various trailer systems and loading dock systems can perform operations, e.g., engage the trailer restraint, activate the air curtain, open the loading dock door, unlock the trailer door, open the trailer door, communicate with an Automated Guided Vehicle (AGV), etc. These operations can be manual or automated, or a combination thereof, and can be performed in a predetermined sequence as necessary for loading dock workflow, safety, etc. In some embodiments, the trailer can include an automated door lock system (e.g., the system 400 shown and described with reference to FIGS. 4A-4E in U.S. Provisional Patent Application No. 63/218,110, filed Jul. 2, 2021, and titled "POWERED TRAILER DOOR SYSTEMS" and related U.S. patent application Ser. No. 17/853,729, filed Jun. 29, 2022, and titled "POWERED TRAILER SYSTEMS" (the "'729 Application"), each of which is incorporated by reference herein in its entirety). The automated door lock system can transition to an unlocked position based on a signal, e.g., a signal from the trailer validation system after verifying that the trailer is positioned at the intended loading dock station, a signal from the driver after the trailer validation system notifies the driver that the trailer is at the intended loading dock station position, a signal from the loading dock system after validation of the trailer, a signal from the loading dock operator, a manual input, etc. In some embodiments, an automated trailer door opening and closing system (e.g., one or more of the systems shown and described in U.S. Provisional Patent Application No. 63/196,143, filed Jun. 2, 2021, and titled "LOADING DOCK AUTOMATED TRAILER DOOR SYSTEMS" and related U.S. patent application Ser. No. 17/829,057, filed May 31, 2022, and titled "LOADING DOCK AUTOMATED TRAILER DOOR SYSTEMS" (the "'057 Application"), each of which is incorporated by reference herein in its entirety) can transition the door between the open and closed positions, e.g., by a loading dock door opening system (such as the systems of the '057 Application), or by an automated trailer door system (such as the systems of the '729 Application). Any of the referenced systems can cause the trailer door to open based on a signal, such as the signals listed above with respect to the automated door lock system, among other suitable signals, such as signals causing mechanical operation of the door opening systems. Embodiments of the systems described herein can also be used in conjunction with embodiments of systems for vehicle and/or trailer power delivery and/or charging systems (e.g., the systems shown and described in U.S. Provisional Patent Application No. 63/247,725, filed Sep. 23, 2021, and titled "POWERED TRAILER SYSTEMS" and related U.S. patent application Ser. No. 17/829,057, filed May 31, 2022, and titled "LOADING DOCK AUTOMATED TRAILER DOOR SYSTEMS" (the "'057 Application"), each of which is incorporated by reference herein in its entirety).

Certain details are set forth in the following description and in FIGS. 1-7 to provide a thorough understanding of various embodiments of the present technology. In other instances, well-known structures, systems, materials and/or operations often associated with trailers, trailer door systems, loading docks, and associated components are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth. Moreover, although many of the embodiments described herein are described in the context of a trailer pulled/pushed by an associated tractor, embodiments of the present technology can be used with any cargo compartment (e.g., any over the road cargo vehicle) and, in particular, those that may not be detachable from a vehicle. The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Additionally, many of the details, dimensions, angles, and other features shown in the Figures are merely illustrative of particular embodiments of the disclosure. Accordingly, other embodiments can have other details, dimensions, angles, and features without departing from the spirit or scope of the present invention. Those of ordinary skill in the art will also appreciate that further embodiments of the invention can be practiced without several of the details described below. In the Figures, identical reference numbers identify identical, or at least generally similar, elements.

FIG. 1 is a flowchart of a routine 100 for operation of a trailer validation system 140 ("system 140") described herein, in accordance with embodiments of the present technology. The system 140 includes portions of the routine 100 that validates whether the trailer is positioned at the intended loading dock station. Portions of the routine 100 can include operations of other trailer and loading dock systems, e.g., the loading dock automated trailer door systems of the '057 Application, the powered trailer door systems of the '729 Application, etc. In some embodiments, the routine 100 can be performed by one or more of the processing devices described in detail below in accordance with non-transitory computer-readable instructions stored on computer-readable media. The routine 100 begins in block 102 when an Enterprise Resource Planning (ERP) system orders items to be delivered by a trailer. ERP can refer to a type of software that organizations use to manage day-to-day business activities. Next, in block 104, the trailer carrying the ordered items is dispatched, and in block 106 the trailer arrives at the facility. In block 108, the trailer is directed to a loading dock station and in block 110 the trailer arrives at the loading dock station.

Next, in block 112, the system 140 validates the trailer to confirm that the trailer is at the correct loading dock station. The system 140 can validate the trailer by any suitable trailer identification and verification method, including the systems shown in FIGS. 4 and 5 and described in detail below, by, e.g., scanning a code (e.g., a QR code, a bar code, an alpha-numeric code, etc.), by receiving a signal from a short range communication device (e.g., a toll tag, a token, a transponder, etc., using one or more of radio-frequency identification (RFID), BLUETOOTH®, near field communications (NFC), etc.), or any other suitable identification method or combination thereof. In other embodiments, the system 140 can validate the trailer by using a printed identification, a license plate, and/or trailer number reader, machine visual recognition, a third-party identification system, or manual identification and validation. If the trailer is not validated, the loading dock control system proceeds to trailer options in block 126, including rejecting the vehicle at block 124, sending the vehicle to a different dock at block 128, and locking operation of the loading dock at block 130 such that no further operations can be performed without proper authorization (e.g., management override, loading dock control system exception, etc.). The routine 100 can then end.

Alternatively, if the trailer is validated by the system 140, the loading dock operation is enabled in block 114. The enabled loading dock operation can include, e.g., unlocking the trailer using, e.g., the automated door lock system 400 of the '729 Application, or other suitable unlocking method (manual, automated, etc.); and/or enabling a loading dock to trailer power connection using, e.g., the loading dock power connection of the '057 Application by energizing contact patches 164a and 164b of the loading dock to provide power to corresponding contact patches 160a and 160b of the trailer, or by other suitable loading dock to trailer power connections (authorization for an operator to manually connect the trailer to loading dock power source using any suitable power connector, enabling an automated loading dock power connection system to the trailer, etc.). In embodiments where the loading dock to trailer power connection is enabled by the system 140 after validation of the trailer, the system can require payment for the power connection (e.g., meter reading fees for power consumption while at the loading dock, etc.).

Next, in block 116, a vehicle restraint, if present, can be engaged with the trailer to prevent movement of the trailer during loading/unloading. If a vehicle restraint is not present, restraint options in block 132 can be available to restrain the vehicle, e.g., wheel chocks, manual restraint, etc., and such restraint options can be verified and input into the loading dock system (e.g., as an override confirmation) to proceed to the next operations. Once the restraint is verified, the loading dock control system queries the trailer door status in block 118, whether the trailer door is open, closed, malfunctioned, etc., which can be verified by visual confirmation, a signal from the controller on the trailer, an AGV, etc. In these embodiments, the loading dock control system can be configured to send and receive various signals related to status of the trailer door (e.g., open or closed, malfunctioned, etc.). The signals can be transmitted via wired or wireless connections, and may be a portion of a loading dock workflow or sequence (either automated or manual), or can be operable manually by a physical switch (e.g., a button on the trailer, tractor, etc.). In some embodiments, the loading dock control system can communicate with an AGV and/or forklift to verify trailer door open/closed/fault status from the controller (e.g., a trailer controller) and communicate such status to the loading dock control system. If the trailer door is closed, the loading dock control system sends a signal to the trailer in block 120, using any suitable system to open the trailer door, e.g., by a loading dock door opening system (such as the systems of the '057 Application), or by an automated trailer door system (such as the systems of the '729 Application). If the trailer door is open at the query in status of block 118 or after opening in block 120, the automated dock process is initiated in block 122. After the automated dock process in block 122, the routine 100 can end. Although not shown, the flowchart 100 may further include sending a signal to close the trailer door and releasing the trailer restraint so that the trailer can depart from the loading dock after the trailer is unloaded/reloaded.

Figure 2:
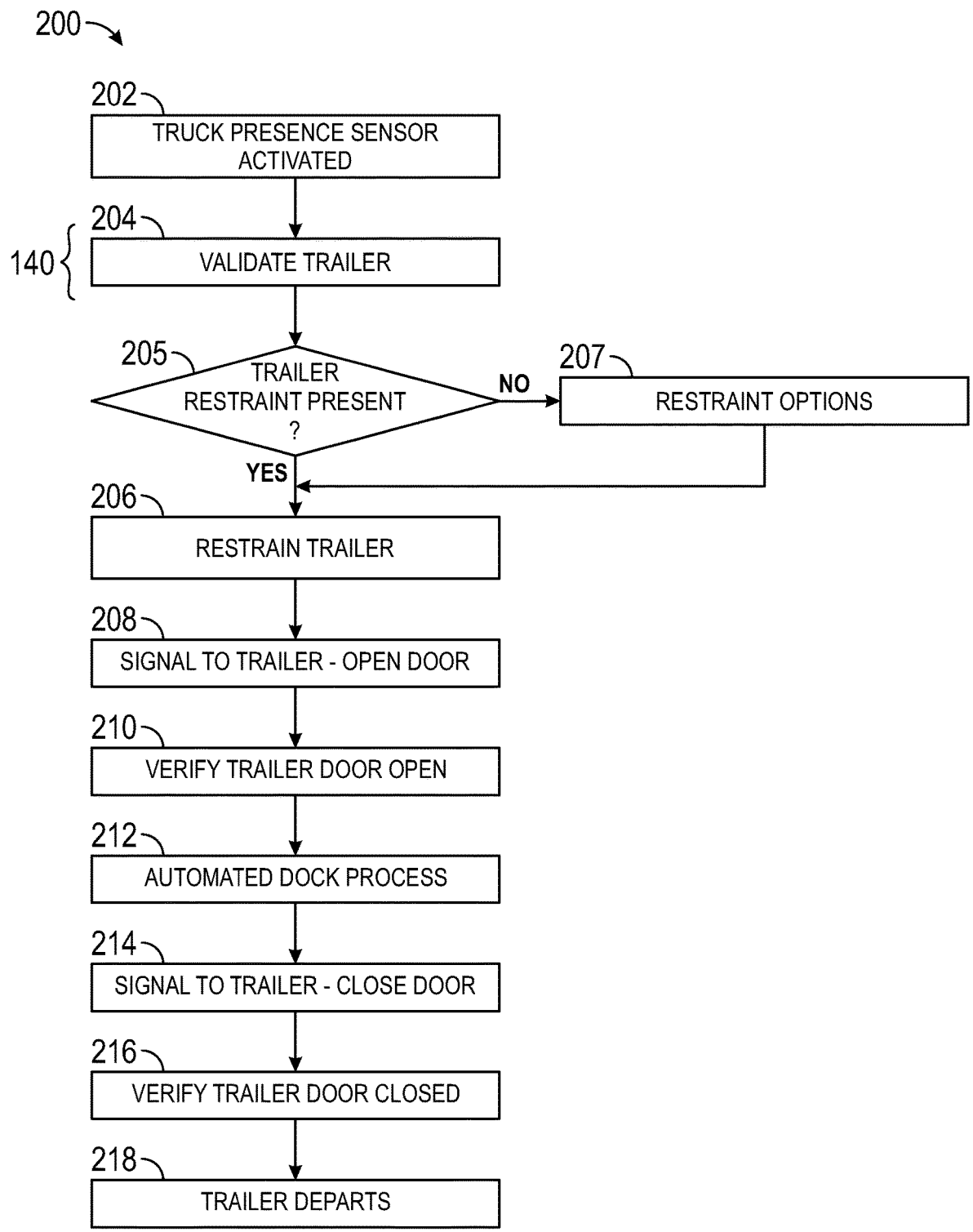

FIG. 2 is a flowchart of a routine 200 for operating a loading dock by a loading dock control system, including operations of the system 140 and an automated trailer door system (such as the systems of the '729 Application) in accordance with embodiments of the present technology. In some embodiments, the routine 200 can be performed by one or more of the processing devices described in detail below in accordance with non-transitory computer-readable instructions stored on computer-readable media. The routine 200 begins in block 202 when a truck presence sensor (e.g., an optical sensor, an electromagnetic sensor, a contact sensor, etc.) senses the presence of a truck/trailer at a loading dock station. The truck presence sensor can be positioned on the parking surface in front of the loading dock, on a loading dock door, a wall of the loading dock, or any other suitable surface. Once the loading dock system at the loading dock senses the presence of a trailer at the loading dock station, the system 140 validates the trailer at block 204 by any suitable trailer identification and verification method, such as those described above with reference to FIG. 1. Although not shown in FIG. 2, if the trailer is not validated, the process can proceed to options similar to the trailer options in block 126 of FIG. 1. If the trailer is validated at block 204, the loading dock control system can determine whether a trailer restraint is present in block 205. If the trailer restraint is present, the loading dock control system can initiate a trailer restraint in block 206, wherein the trailer restraint is applied to the trailer. The trailer restraint can be any suitable restraint for preventing movement of the trailer during loading/unloading. If the trailer restraint is not present, restraint options in block 207 can be available to restrain the vehicle, e.g., wheel chocks, manual restraint, etc., and such restraint options can be input into and verified by the loading dock control system (e.g., as an override confirmation) to proceed to the next operations. Next, in block 208, the loading dock control system sends a signal to a controller on the trailer (e.g., a processor, programmable logic controller (PLC), or other suitable processing device that executes computer readable instructions stored on memory, etc., or the controller 150, 250, and/or 350 described in the '729 Application) to open the trailer door using any suitable automated trailer door system (e.g., the systems 100-300 of the '729 Application). In other embodiments, the loading dock control system can send a signal or otherwise alert a driver of the trailer and/or an operator of the loading dock to open the trailer door.

In trailers having an automated locking system (e.g., the automated trailer door latch system 400 of the '729 Application), the loading dock control system may first send a signal to unlock the trailer door prior to opening the trailer door. The signal can be wireless, or can be a wired signal through contacts on the trailer. Next, at block 210, the loading dock control system at the loading dock verifies that the trailer door is open, e.g., by visual confirmation, a signal from the controller on the trailer, an AGV, etc. Once the loading dock control system at the loading dock verifies that the trailer door is open, in block 212, an automated dock process may be initiated (e.g., turning on one or more lights, deploying a door seal, leveling the dock, loading/unloading the trailer, etc.). After the automated dock process concludes, in block 214, the loading dock control system can send a signal to the controller on the trailer to close the trailer door and lock the trailer door, if applicable. Next, in block 216, the loading dock control system verifies that the trailer door is closed, e.g., by visual confirmation, a signal from the controller on the trailer, an AGV, etc. Next, in block 218, the trailer restraint may be released such that the trailer can depart freely.

Figure 3:
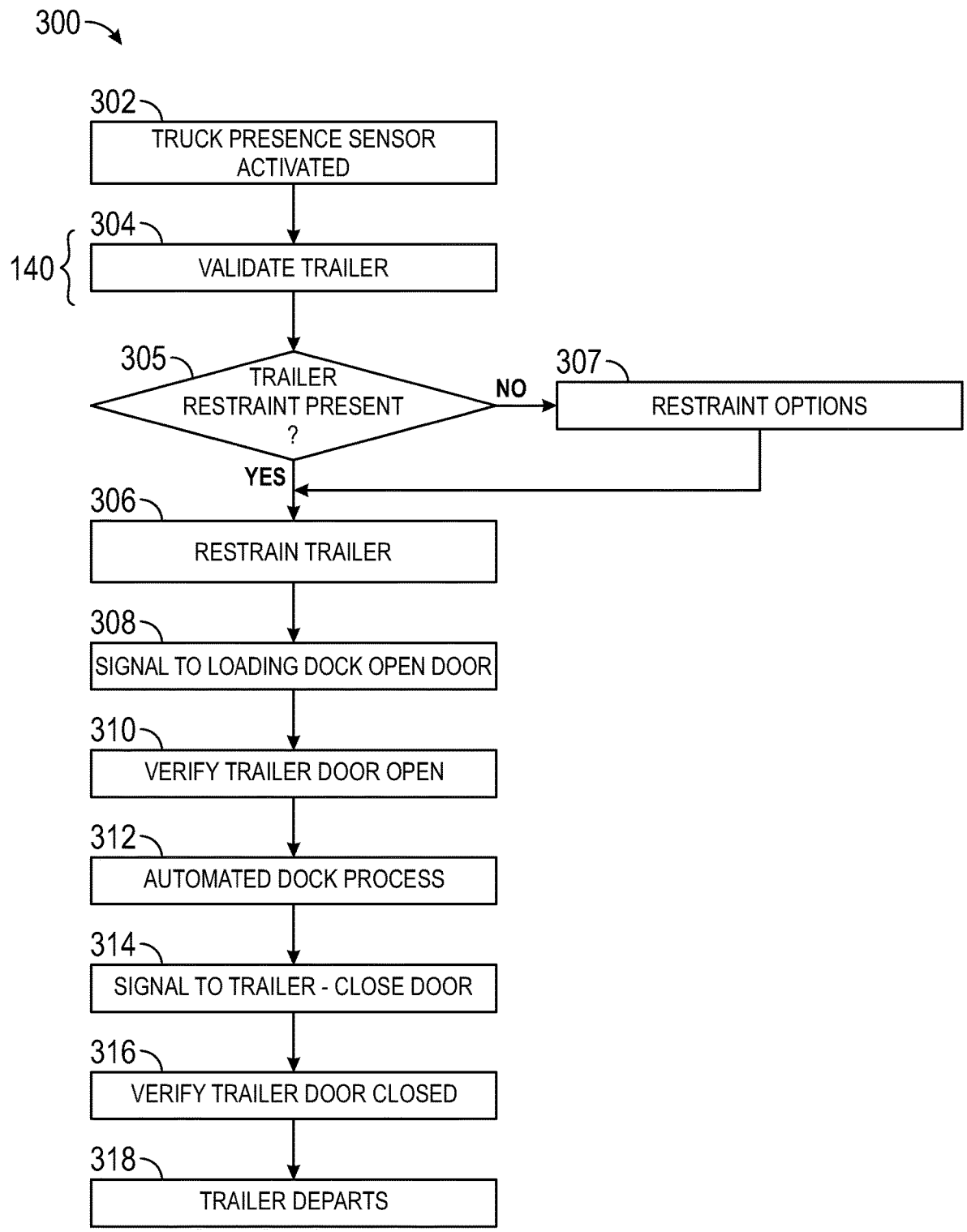

FIG. 3 is a flowchart of a routine 300 for operating a loading dock, including operations of the system 140 and a loading dock door opening system (such as the systems of the '057 Application) in accordance with embodiments of the present technology. In some embodiments, the routine 300 can be performed by one or more of the processing devices described in detail below in accordance with non-transitory computer-readable instructions stored on computer-readable media. The routine 300 begins in block 302 when a truck presence sensor (e.g., an optical sensor, an electromagnetic sensor, a contact sensor, etc.) senses the presence of a truck/trailer at a loading dock station. The truck presence sensor can be positioned on the parking surface in front of the loading dock, on a loading dock door, a wall of the loading dock, or any other suitable surface. Once the loading dock system at the loading dock senses the presence of a trailer at the loading dock station, the system 140 validates the trailer at block 304 by any suitable trailer identification and verification method, such as those described above with reference to FIG. 1. Although not shown in FIG. 3, if the trailer is not valid, the process can proceed to options similar to the trailer options in block 126 of FIG. 1. If the trailer is validated at block 304, the loading dock control system can determine whether a trailer restraint is present in block 305. If the trailer restraint is present, the loading dock control system can initiate a trailer restraint in block 306, wherein the trailer restraint is applied to the trailer if the restraint is present. The trailer restraint can be any suitable restraint for preventing movement of the trailer during loading/unloading. If the trailer restraint is not present, restraint options in block 307 can be available to restrain the vehicle, e.g., wheel chocks, manual restraint, etc., and such restraint options can be input into and verified by the loading dock control system (e.g., as an override confirmation) to proceed to the next operations. Next, in block 308, the loading dock control system, e.g. as described above, sends a signal to the loading dock door opening system (e.g., the systems 100-400,700, and/or 800 of the '057 Application), to an AGV (e.g., the systems 500 and 600 of the '057 Application), to an operator to manually open the door, etc.

In trailers having an automated locking system (e.g., the automated trailer door latch system 400 of the '729 Application), the loading dock control system may first send a signal to unlock the trailer door prior to opening the trailer door. The signal can be wireless, or can be a wired signal through contacts on the trailer. Next, and block 310, the loading dock control system at the loading dock verifies that the trailer door is open, e.g., by visual confirmation, a signal from the controller on the trailer, an AGV, etc. Once the loading dock control system at the loading dock verifies that the trailer door is open, in block 312, an automated dock process may be initiated (e.g., turning on one or more lights, deploying a door seal, leveling the dock, loading/unloading the trailer, etc.). After the automated dock process concludes, in block 314, the loading dock control system can send a signal to the controller on the trailer to close the trailer door and lock the trailer door, if applicable. Next, in block 316, the loading dock control system verifies that the trailer door is closed, e.g., by visual confirmation, a signal from the controller on the trailer, an AGV, etc. Next, in block 318, the trailer restraint may be released such that the trailer can depart freely.

Figure 4:
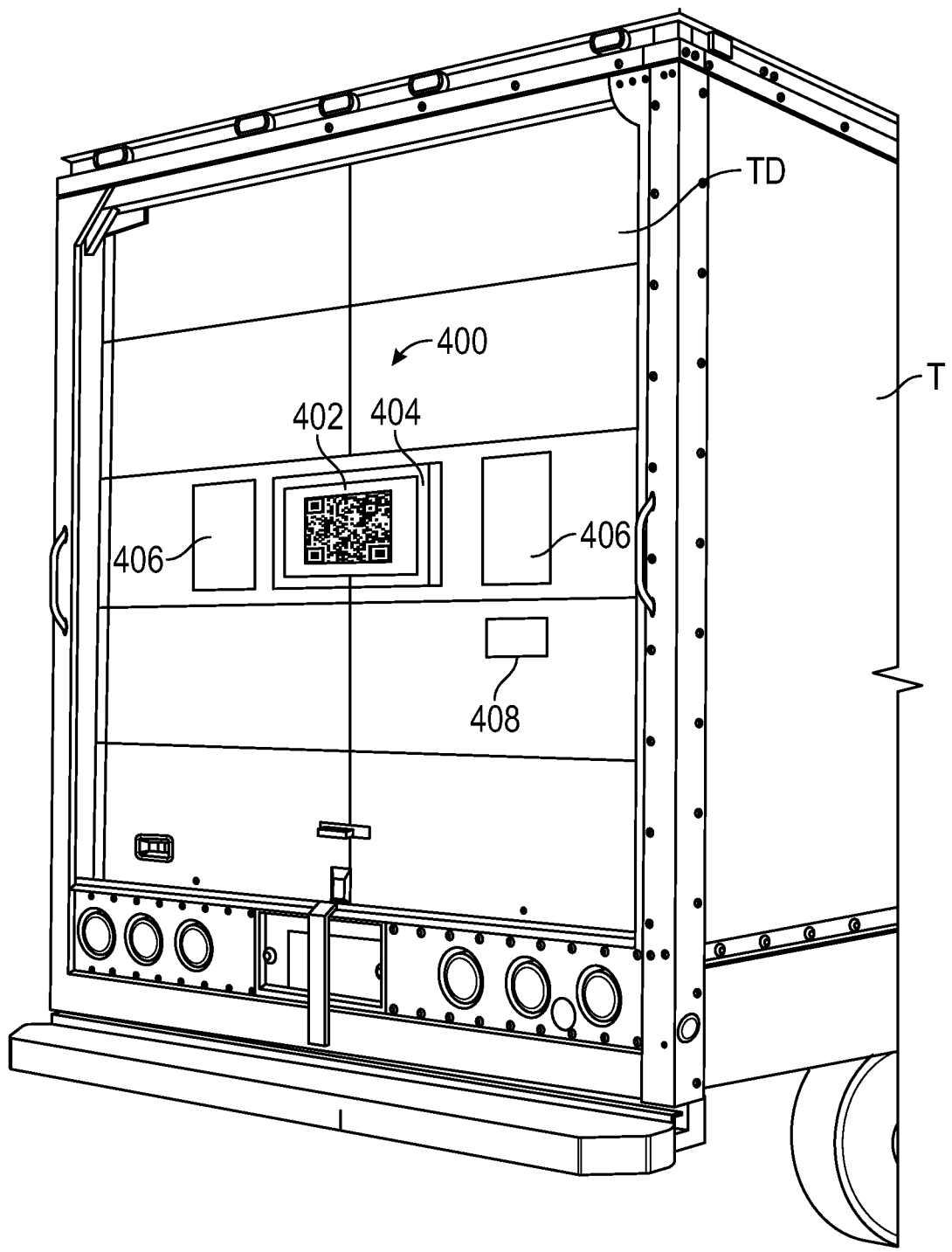
FIG. 4 is a rear isometric view of trailer having trailer and/or loading dock identification systems configured in accordance with embodiments of the present technology.

FIG. 4 shows an embodiment of a trailer identification system 400 configured in accordance with embodiments of the present technology and suitable for use with any of the routines 100-300 described above in reference to FIGS. 1-3. The trailer identification system 400 can be used to identify a trailer T and/or a loading dock station and verify that the trailer T is at the correct (e.g., the assigned) loading dock station, e.g., during steps 112,204, and/or 304 of the processes 100-300, respectively, by a loading dock trailer identification system that will be described in greater detail below with reference to FIG. 5, and/or other suitable trailer validation systems. The trailer identification system 400 can include an information display screen 402 positioned on a trailer door TD. In other embodiments, the information screen 402 can be placed on the sides, roof, or any other suitable (externally visible) surface of the trailer T. The screen 402 can be contained within an enclosure 404. As shown schematically in FIG. 6, the screen 402 can be operably connected to one or more short range communication devices (e.g., wireless, BLUETOOTH®, near field communications (NFC), etc.) to enable the loading facility (e.g., a loading dock station at a facility that loads goods on the trailer T) and/or another location to transmit information (e.g., QR codes, payload information, etc.) for display on the information screen 402, and for the unloading facility and/or other location (e.g., a loading dock at a facility that unloads goods off the trailer T) to clear information or change information on the information screen 402 for reloading with new information. For example, the loading facility and/or another location can transmit first information related to the identity of the trailer T to the trailer identification system 400, and the same or a different loading facility and/or another location can subsequently transmit second information to the trailer identification system 400. The second information can also be related to the identity of the trailer T, and can be different from the first information, such as information about an updated identity of the trailer after the trailer T has been unloaded and subsequently reloaded with a new payload.

At the unloading facility, a camera, a scanner, and/or a reader (e.g., an optical reader, an infrared reader, a radiofrequency reader) of a loading dock control system (as shown schematically in FIG. 7) can scan a unique code, e.g., a QR code, a machine-readable indicia, and/or other scannable indicia on the information screen 402, and determine whether the trailer T is valid for that particular loading dock station. Some embodiments of the information screen 402 can use, e.g., an E-Ink type screen available at eink.com, a liquid crystal display (LCD) screen, a light-emitting diode (LED) screen, a quantum dot (QLED) display, and/or another type of display. Such screens use power only when transitioning the display of the screen. The system 400 can include batteries or capacitors for powering the system 400. One or more solar panels 406 and/or other regenerative energy devices can be used to charge the system 400, or the system 400 can be connected to the power system of the trailer T. In some embodiments, if the trailer T is in transit or empty, the information screen 402 can display advertising or other information.

In some embodiments, the trailer identification system 400 includes a trailer unit 408 that can include a variety of devices for identification of the loading dock station or transmission of information related to the identity of the trailer T. As described below in reference to FIG. 6, the trailer unit 408 can include a camera, a scanner, a reader, one or more short range communication devices, etc., (shown schematically in FIG. 6) that are capable of receiving information about the identity of the loading dock station (e.g., by scanning a code displayed at the loading dock station, receiving a short range communication, etc.), or transmitting information about the identity of the trailer T (e.g., by transmitting a short range communication, etc.), to verify that the trailer is approaching and/or parked at the proper loading dock station by comparing the loading dock station assignment to the identity. When the trailer T has validated its position at the proper loading dock station with the trailer unit 408, the loading dock can proceed with operations, such as those described above with reference to FIG. 1-3 above. In some embodiments, if the identity of the loading dock station does not match the assignment of the trailer T by the loading dock control system (or logistics yard control system), the trailer T can be directed to a different loading dock station.

Figure 5:
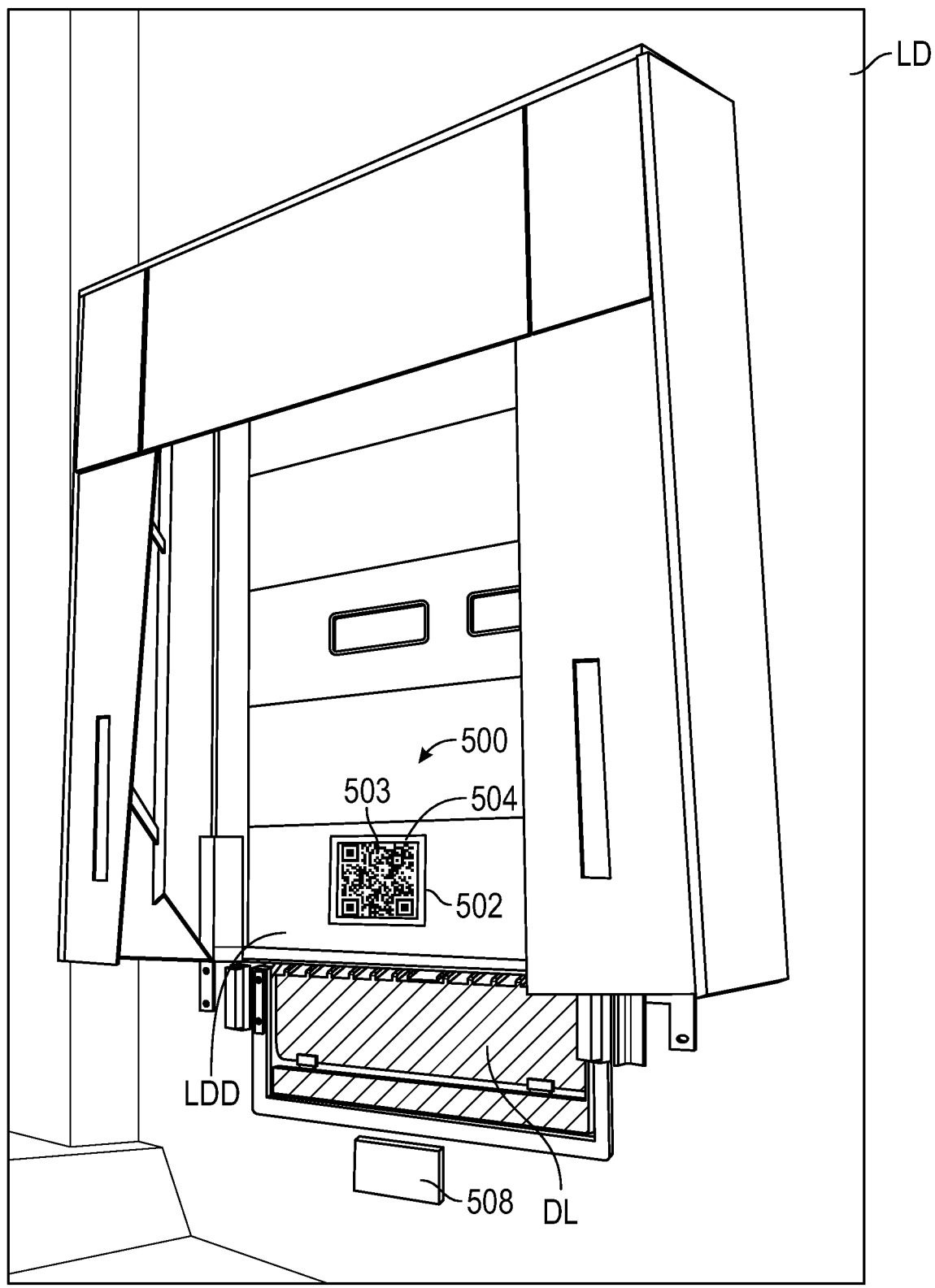
FIG. 5 is a front isometric view of loading dock having trailer and/or loading dock identification systems configured in accordance with embodiments of the present technology.

FIG. 5 shows an embodiment of a loading dock identification system 500 configured in accordance with embodiments of the present technology and suitable for use with any of the routines 100-300 described above in reference to FIGS. 1-3. The loading dock identification system 500 can be used to identify a trailer T and/or a loading dock station and verify that the trailer T is at the proper loading dock station during steps 112, 204, and/or 304 of the routines 100-300, respectively, described above, or by other suitable loading dock identification systems. The loading dock identification system 500 can include an information display screen 502 positioned on a loading dock door LDD. In other embodiments, the information screen 502 can be placed on a dock leveler DL (e.g., the dock leveler lip), dock curtain, or any other suitable (externally visible) surface of the loading dock station LD, or can be separate but proximate to the loading dock LD, such as a beacon positioned along the approach to the loading dock station. The screen 502 can be contained within an enclosure 504. As shown schematically in FIG. 7, the screen 502 can include one or more short range communication devices (e.g., wireless BLUETOOTH®, or near field communications (NFC), etc.) to enable the loading dock control system to transmit and display information (e.g., QR codes, payload, etc.) on the information screen 502. In use, a camera, scanner, and/or reader of the trailer identification system 400 (e.g., the trailer unit 408) can scan a unique code, e.g., a QR code 503 on the information screen 502, and determine whether the trailer is valid for that particular loading dock station. Some embodiments of the information screen 502 can use, e.g., an E-Ink type screen, an LED screen, an LCD screen, an LED display screen, a QLED screen, and/or another type of display screen.

The loading dock identification system 500 can include a dock unit 508 that can include a variety of devices for identification of the trailer or transmission of information related to the identity of the loading dock station LD. As described in detail below with reference to FIG. 7, the dock unit 508 can include a camera, a scanner, a reader, and/or one or more short range communication devices (shown schematically in FIG. 7) that are capable of receiving information about the identity of the trailer (e.g., by scanning a code, receiving a short range communication, etc.), or transmitting information about the identity of the loading dock station (e.g., transmitting a short range communication, etc.) to verify that the trailer is approaching and/or parked at the proper loading dock station by comparing the loading dock station assignment to the received identifying information. When the loading dock control system has validated the position of the trailer at the proper loading dock station with the loading dock unit 508, the loading dock can proceed with operations, such as those described above with reference to FIG. 1-3 above. In some embodiments, if the identity of the trailer does not match the assignment by the loading dock control system (or logistics yard control system), the loading dock control system can direct the trailer to a different loading dock station.

Figure 6:
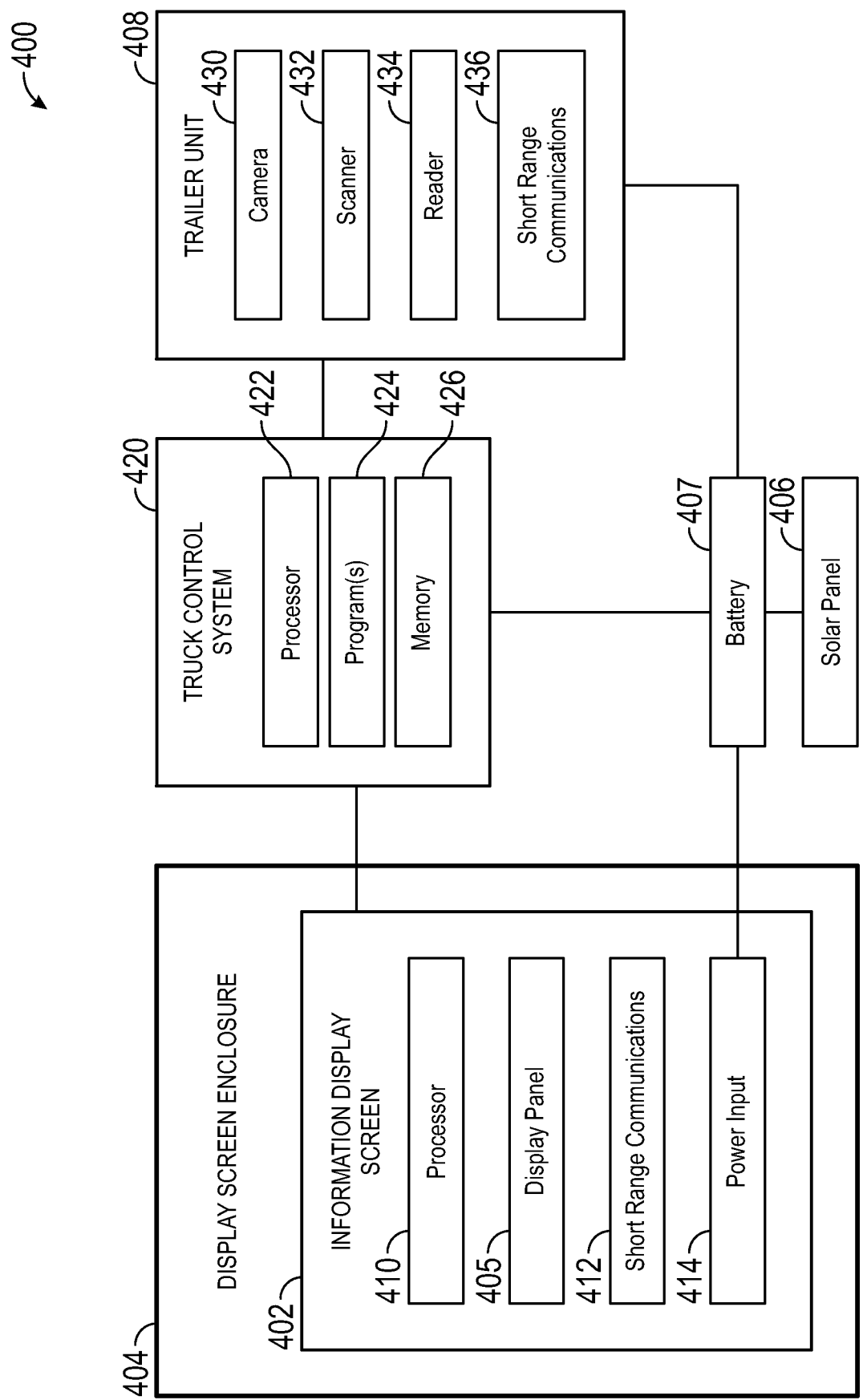
FIG. 6 is a block diagram of a trailer identification system configured in accordance with embodiments of the present technology.

FIG. 6 is a block diagram of the trailer identification system 400 configured in accordance with embodiments of the present technology. The trailer identification system 400 can include a truck control system 420, the information display screen 402, the trailer unit 408, a battery 407, and the solar panel 406. While the truck control system 420 is shown as being connected to the information display screen 402 and the trailer unit 408, in various embodiments, any of these entities can be directly or indirectly networked to each other wirelessly and/or by various wired connections. In addition, in various embodiments, one or more of the depicted entities can be excluded and/or replaced with other elements. The connections between any of the truck control system 420, the display screen 402, the trailer unit 408, and/or various other depicted elements can include one or more of a local area network (LAN), a wide area network (WAN), or other wired or wireless networks. These networks may include the Internet or some other public or private network. The networks can include a wireless network, e.g., using WiFi, cellular, mesh networks (e.g., Zigbee, Z-Wave, Bluetooth, Thread), etc. The network(s) can be implemented using various standards such as IEEE 802.15.4 (e.g., Zigbee or Thread), IEEE 802.11x (e.g., wireless Lan, WiFi Beacons, Bluetooth SIG, BTLE, Bluetooth Beacons, Bluetooth Mesh), cellular network technologies, IEEE 802.16, etc.

Though trailer control system 420 and other entities are depicted logically as a single element, the trailer control system 420 can be a distributed computing environment encompassing multiple computing devices located, e.g., on the trailer, tractor, etc. The trailer control system 420 can include one or more processors 422, a program memory 424, and a storage memory 426. The trailer control system 420 is in communication with the information display screen 402, which can be in the enclosure 404 and can include one or more processors 410, a display panel 405, short range communications 412, and a power input 414 for receiving power from the battery 407. As described above, the battery 407 can receive power from the solar panel 406, e.g., to charge the battery when the tractor is not running and/or the trailer identification system 400 is not connected to a power source. The trailer control system 420 is in communication with the trailer unit 408, which can include a camera 430, a scanner 432, a reader 434, and short range communications 436. As described above, the truck unit 408 is capable of receiving information about the identity of the loading dock station (e.g., by scanning a code with the camera 430 or scanner 432, receiving with the short range communications 436, etc.), or transmitting information about the identity of the trailer T (e.g., by transmitting with the short range communications 436, etc.), to verify that the trailer is approaching and/or parked at the proper loading dock station by comparing the loading dock station assignment to the identity.

Figure 7:
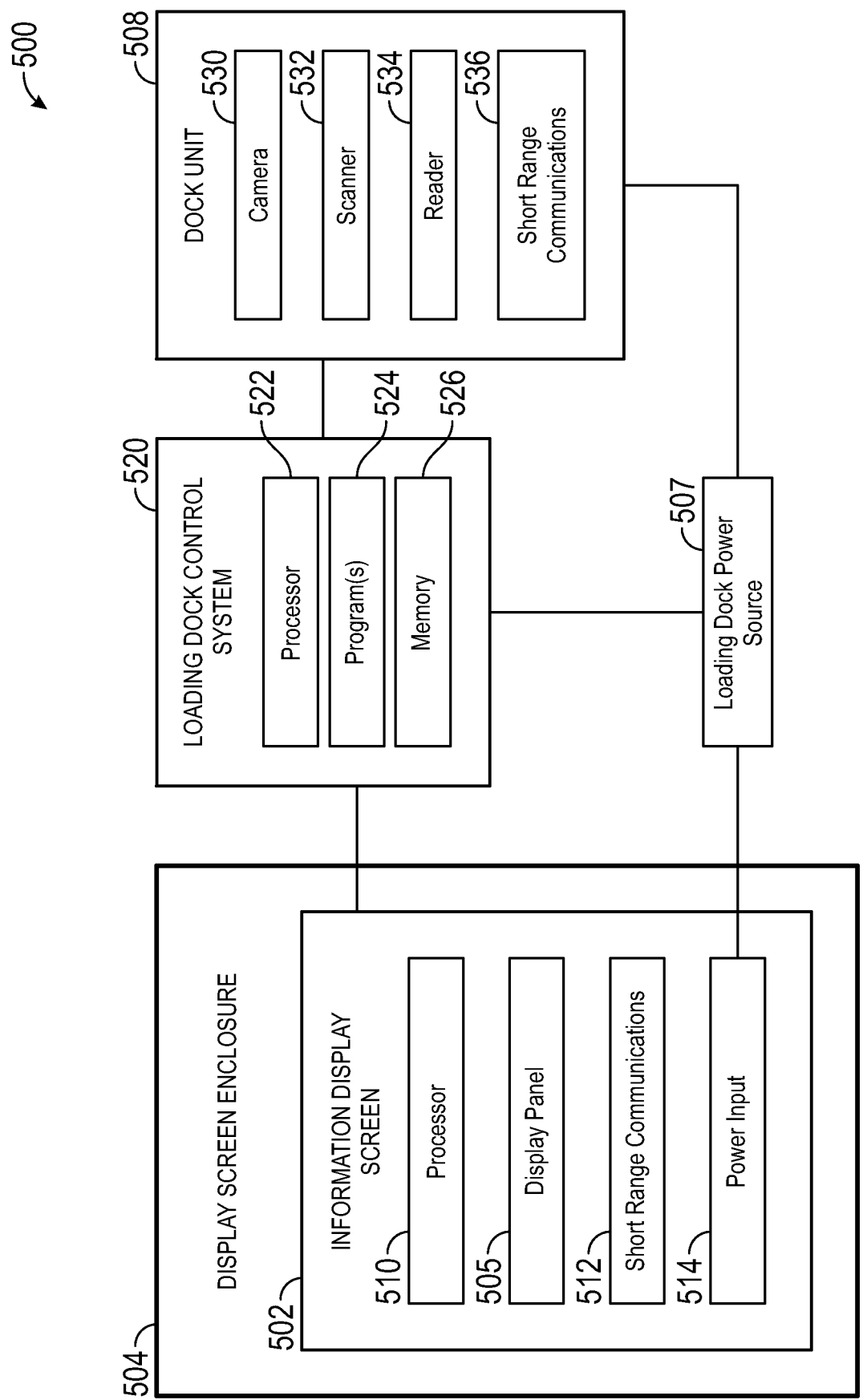
FIG. 7 is a block diagram of a loading dock identification system configured in accordance with embodiments of the present technology.

FIG. 7 is a block diagram of the loading dock identification system 500 configured in accordance with embodiments of the present technology. The loading dock identification system 500 can include a loading dock control system 520, the information display screen 502, the dock unit 508, and a loading dock power source 507. While the loading dock control system 520 is shown as being connected to the information display screen 502 and the dock unit 508, in various embodiments, any of these entities can be directly or indirectly networked to each other wirelessly and/or by various wired connections. In addition, in various embodiments, one or more of the depicted entities can be excluded and/or replaced with other elements. The connections between any of the loading dock control system 520, the display screen 502, the dock unit 508, or various other depicted elements can include one or more of a local area network (LAN), a wide area network (WAN), and/or other wired or wireless networks. These networks may include the Internet or some other public or private network. The networks can include a wireless network, e.g., using WiFi, cellular, mesh networks (e.g., Zigbee, Z-Wave, Bluetooth, Thread), etc. The network(s) can be implemented using various standards such as IEEE 802.15.4 (e.g., Zigbee or Thread), IEEE 802.11x (e.g., wireless Lan, WiFi Beacons, Bluetooth SIG, BTLE, Bluetooth Beacons, Bluetooth Mesh), cellular network technologies, IEEE 802.16, etc.

The loading dock control system 520 can include one or more servers which receive requests and coordinate fulfillment of those requests. Though loading dock control system 520 and other entities are depicted logically as a single element, the loading dock control system 520 can be a distributed computing environment encompassing multiple computing devices located at the same or at geographically disparate physical locations. The loading dock control system 520 can include one or more processors 522, a program memory 524, and a storage memory 526. The loading dock control system 520 is in communication with the information display screen 502, which can be in the enclosure 504 and can include one or more processors 510, a display panel 505, short range communications 512, and a power input 514 for receiving power from the loading dock power source 507. The loading dock control system 520 is in communication with the dock unit 508, which can include a camera 530, a scanner 532, a reader 534, and short range communications 536. As described above, the dock unit 508 is capable of receiving information about the identity of the trailer T (e.g., by scanning a code with the camera 530 or scanner 532, receiving with the short range communications 536, etc.), or transmitting information about the identity of the loading dock station (e.g., by transmitting with the short range communications 536, etc.), to verify that the trailer is approaching and/or parked at the proper loading dock station by comparing the loading dock station assignment to the identity.

Any of the processing devices described herein (e.g., the processor 422, the processor 522, and/or a processing device configured to carry out all or a portion of the routines 100-300 described in detail with reference to FIGS. 1-3, respectively) can comprise a processor and a non-transitory computer-readable storage medium (e.g., the memory 426, the memory 526) that stores instructions (e.g., the programs 424, the programs 524, and/or all or a portion of the routines 100-300) that when executed by the processor, carry out the functions attributed to the various processing devices as described herein. Although not required, aspects and embodiments of the present technology can be described in the general context of computer-executable instructions, such as routines executed by a general-purpose computer, e.g., a server or personal computer. Those skilled in the relevant art will appreciate that the present technology can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The present technology can be embodied in a special purpose computer or data processor that is specifically programmed, configured or constructed to perform one or more of the computer-executable instructions explained in detail below. Indeed, the term "computer" (and like terms), as used generally herein, refers to any of the above devices, as well as any data processor or any device capable of communicating with a network, including consumer electronic goods such as game devices, cameras, or other electronic devices having a processor and other components, e.g., network communication circuitry.

The present technology can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or sub-routines can be located in both local and remote memory storage devices. Aspects of the present technology described below can be stored or distributed on non-transitory computer-readable media, including magnetic and optically readable and removable computer discs, stored as in chips (e.g., EEPROM or flash memory chips). Alternatively, aspects of the present technology can be distributed electronically over the Internet or over other networks (including wireless networks). Those skilled in the relevant art will recognize that portions of the present technology can reside on a server computer, while corresponding portions reside on a client computer. Data structures and transmission of data particular to aspects of the present technology are also encompassed within the scope of the present technology.

The following examples are illustrative of several embodiments of the present technology:

1. An identification system for use with a trailer, the identification system comprising:
   a display screen configured to be positioned on a surface of the trailer;
   a processor operably connected to the display screen;
   a communication device operably connected to the processor, the communication device configured to receive information related to an identity of the trailer; and
   a non-transitory computer-readable medium containing instructions that, when executed by the processor, cause the processor to display, via the display screen, at least a portion of the information related to the identity of the trailer received by the communication device.

2. The identification system of example 1 wherein the communication device is configured to receive the information related to the identity of the trailer from a loading dock station, a tractor, an automated guided vehicle (AGV), and/or a remote location.

3. The identification system of example 2 wherein the information related to the identity of the trailer is first information, and wherein the communication device is further configured to receive second information from the loading dock station, the tractor, the AGV, and/or the remote location, wherein the instructions, when executed by the processor, further cause the processor to clear and/or change the information related to the identity of the trailer displayed via the display screen in response to receiving the second information from the loading dock station.

4. The identification system of any one of examples 1-3 wherein the information related to the identity of the trailer includes a QR code, a bar code, and/or other computer-readable indicia.

5. The identification system of any one of examples 1-4 wherein the instructions, when executed by the processor, further cause the processor to display, via the display screen, an advertisement when the trailer is in transit and/or empty.

6. The identification system of any one of examples 1-5, further comprising a trailer unit operably connected to the display screen, the trailer unit comprising a camera, a scanner, and/or other optical reading device configured to read information displayed at a loading dock station.

7. The identification system of example 6 wherein the camera, scanner, and/or other optical reading device is configured to read information related to an identity of the loading dock station displayed at the loading dock station.

8. The identification system of example 6 or example 7 wherein the trailer unit further comprises the communication device, and wherein the communication device is further configured to receive information related to an identity of the loading dock station from the loading dock station, a tractor, an automated guided vehicle (AGV), and/or a remote location.

9. The identification system of example 8 wherein the information related to the identity of the loading dock station includes information configured to enable the trailer unit to verify that the trailer is approaching or parked at a proper loading dock station by comparing a loading dock station assignment to the information related to the identity of the loading dock station.

10. The identification system of any one of examples 6-9 wherein the trailer unit further comprises the communication device, and wherein the communication device is further configured to transmit the information related to the identity of the trailer to the loading dock station, a tractor, an automated guided vehicle (AGV), and/or a remote location.

11. The identification system of any one of examples 1-10 wherein the display screen is positioned on an exterior surface of a rear door of the trailer.

12. The identification system of any one of examples 1-11, further comprising a battery electrically connected to the identification system and a regenerative energy device electrically connectable to the battery, wherein the regenerative energy device is configured to provide electrical charge to the battery.

13. The identification system of any one of examples 1-12 wherein the information related to the identity of the trailer is first information, wherein the display screen is positioned on an exterior surface of a rear door of the trailer, wherein the identification system further includes a camera, scanner, and/or other optical reading device configured to read second information displayed at a loading dock station, and wherein the second information is related to an identity of the loading dock station and is configured to enable the identification system to verify the identity of the loading dock station by comparing a loading dock station assignment to the second information.

14. An identification system for use with a loading dock station, the identification system comprising:
  a display screen configured to be positioned on a surface of the loading dock station;
  a processor operably connected to the display screen;
  a communication device operably connected to the processor, the communication device configured to receive information related to an identity of a trailer; and
  a non-transitory computer-readable medium containing instructions that, when executed by the processor, cause the processor to display, via the display screen, at least a portion of the information related to the identity of the trailer received by the communication device, wherein the displayed information related to the identity of the trailer is readable by a scanner and/or reader device mounted to a trailer to enable the trailer to identify the loading dock station.

15. The identification system of example 14 wherein the communication device is configured to receive the information related to the identity of the trailer from a loading facility, a tractor, a trailer, an automated guided vehicle (AGV), and/or a remote location.

16. The identification system of example 14 or example 15 wherein the information related to the identity of the trailer is first information, and wherein the communication device is further configured to receive second information from the loading facility, the tractor, the trailer, the AGV, and/or the remote location, wherein the instructions, when executed by the processor, further cause the processor to clear and/or change the information related to the identity of the trailer displayed via the display screen in response to receiving the second information.

17. The identification system of any one of examples 14-16 wherein the information related to the identity of the trailer includes a QR code, a bar code, and/or a computer-readable indicia.

18. The identification system of any one of examples 14-17, further comprising a dock unit operably connected to the display screen, the dock unit comprising a camera, a scanner, and/or other optical reading device configured to read information displayed on the trailer.

19. The identification system of example 18 wherein the camera, scanner, and/or other optical reading device is configured to read the information related to the identity of the trailer displayed on the trailer.

20. The identification system of example 18 or example 19 wherein the dock unit further comprises the communication device, and wherein the communication device is further configured to receive the information related to the identity of the trailer from a loading facility, a tractor, a trailer, an automated guided vehicle (AGV), and/or a remote location.

21. The identification system of any one of examples 18-20 wherein the dock unit further comprises the communication device, and wherein the communication device is further configured to transmit information related to an identity of the loading dock station to a loading facility, a tractor, the trailer, an automated guided vehicle (AGV), and/or a remote location.

22. The identification system of any one of examples 18-21 wherein the information related to the identity of the trailer includes information to enable the dock unit to verify that the trailer is approaching or parked at the proper loading dock station by comparing a loading dock station assignment to the information related to the identity of the trailer.

23. The identification system of any one of examples 14-22 wherein the display screen is positioned on an exterior surface of a dock door, a dock leveler, or a dock curtain of the loading dock station.

24. The identification system of any one of examples 14-23 wherein the information related to the identity of the trailer is first information, wherein the display screen is positioned on an exterior surface of a dock door, a dock leveler, or a dock curtain of the loading dock station, wherein the identification system further includes a camera, scanner, and/or other optical reading device configured to read second information displayed on the trailer, and wherein the second information is related to the identity of the trailer and is configured to enable the identification system to verify the identity of the trailer by comparing a loading dock station assignment to the information related to the identity of the trailer.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, for fluid (e.g., air) transfer, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. From the foregoing, it will be appreciated that specific embodiments of the invention have been described herein for purposes of illustration, but that various modifications may be made without deviating from the spirit and scope of the various embodiments of the invention. Accordingly, the invention is not limited, except as by the appended claims.

Any patents and applications and other references noted above, including any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified, if necessary, to employ the systems, functions, and concepts of the various references described above to provide yet further implementations of the invention.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

The invention claimed is:

1. An identification system for use with a loading dock station, the identification system comprising:
   a display screen configured to be positioned on a dock door of the loading dock station facing an area for receiving a trailer;
   a processor operably connected to the display screen;
   a communication device operably connected to the processor, the communication device configured to receive information related to an identity of the trailer; and
   a non-transitory computer-readable medium containing instructions that, when executed by the processor, cause the processor to display, via the display screen, at least a portion of the information related to the identity of the trailer received by the communication device, wherein the displayed information related to the identity of the trailer is readable by a scanner or reader device mounted to the trailer, and wherein the scanner or reader mounted to the trailer is configured to identify the loading dock based on the displayed information.

2. The identification system of claim 1 wherein the communication device is configured to receive the information related to the identity of the trailer from a loading facility, a tractor, a trailer, an automated guided vehicle (AGV), or a remote location.

3. The identification system of claim 2 wherein the information related to the identity of the trailer is first information, and wherein the communication device is further configured to receive second information from the loading facility, the tractor, the trailer, the AGV, or the remote location, wherein the instructions, when executed by the processor, further cause the processor to clear or change the first information displayed via the display screen in response to receiving the second information.

4. The identification system of claim 1 wherein the information related to the identity of the trailer includes a QR code, a bar code, or a computer-readable indicia.

5. The identification system of claim 1, further comprising a dock unit operably connected to the display screen, the dock unit comprising a camera, a scanner, or other optical reading device configured to read information displayed on the trailer.

6. The identification system of claim 5 wherein the camera, scanner, or other optical reading device is configured to read the information related to the identity of the trailer displayed on the trailer.

7. The identification system of claim 5 wherein the dock unit further comprises the communication device, and wherein the communication device is further configured to receive the information related to the identity of the trailer from a loading facility, a tractor, a trailer, an automated guided vehicle (AGV), or a remote location.

8. The identification system of claim 5 wherein the dock unit further comprises the communication device, and wherein the communication device is further configured to transmit information related to an identity of the loading dock station to a loading facility, a tractor, the trailer, an automated guided vehicle (AGV), or a remote location.

9. The identification system of claim 5 wherein the dock unit is configured to verify that the trailer is approaching or parked at a proper loading dock station by comparing a loading dock station assignment to the information related to the identity of the trailer.

10. The identification system of claim 1 wherein the information related to the identity of the trailer is first information, wherein the display screen is positioned on an exterior surface of a dock door, a dock leveler, or a dock curtain of the loading dock station, wherein the identification system further includes a camera, scanner, or other optical reading device configured to read second information displayed on the trailer, wherein the second information is related to the identity of the trailer, and wherein the processor is configured to verify the identity of the trailer by comparing a loading dock station assignment to the information related to the identity of the trailer.

\* \* \* \* \*